United States Patent Office 2,802,770
Patented Aug. 13, 1957

2,802,770

2-ALKYL-3,4,5,6-TETRAHYDROPYRIMIDINE NITRATE AND FUNGICIDAL COMPOSITION THEREOF

Carl M. Monroe and William E. Rader, Modesto, Calif., and William J. Raab, Haworth, N. J., assignors to Shell Development Company, Emeryville, Calif., a corporation of Delaware No Drawing. Application August 18, 1952,
Serial No. 305,088

2 Claims. (Cl. 167—33)

This invention relates to new chemical compounds having the structural formula

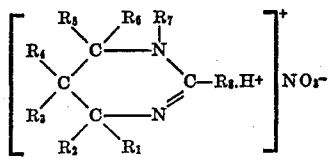

In this formula, each $R_1$, $R_2$, $R_3$, $R_4$, $R_5$ and $R_6$ can be a hydrogen atom or the same or different organic radicals; but if the latter, then they are preferably lower alkyl substituents having up to about 4 carbon atoms.

$R_7$ is preferably a hydrogen atom, but it can also be a saturated hydrocarbon radical containing from 1 to 3 carbon atoms, which radical can also be substituted with an amino or hydroxyl group.

$R_8$ must be a saturated alkyl group of from about 11 to about 21 carbon atoms, and preferably from 15 to 19 carbon atoms.

These 3,4,5,6-tetrahydropyrimidine nitrate salts have unique and unexpected properties which make them particularly suitable and valuable as foliage fungicides.

The present tetrahydropyrimidine nitrate salts may be prepared very readily by neutralization of the free tetrahydropyrimidine with a molecular equivalent of nitric acid. For example, 2-heptadecyl-4,4,6-trimethyl-3,4,5,6-tetrahydropyrimidine nitrate was prepared as follows:

A sample of 2-heptadecyl-4,4,6-trimethyl-3,4,5,6-tetrahydropyrimidine was dissolved in methyl alcohol, and concentrated nitric acid was added until the tetrahydropyrimidine was neutralized (as indicated by methyl red). The neutralized solution was stripped on a steam bath at 4 mm. Hg absolute pressure, yielding the nitrate salt, which was further purified by two recrystallizations from warm water. The pure 2-heptadecyl-4,4,6-trimethyl-3,4,5,6-tetrahydropyrimidine exists as fine white needle-like crystals melting at 58.5°–59.5° C. and analyzing as follows:

|  | Calculated | Found |
|---|---|---|
| Wt. Percent N | 9.81 | 9.95 |
| Wt. Percent $NO_3^-$ | 14.5 | 16.0 |

Other 2-alkyl-3,4,5,6-tetrahydropyrimidine nitrate salts, e. g., 2-heptadecyl-3,4,5,6-tetrahydropyrimidine nitrate, 2-undecyl-3,4,5,6-tetrahydropyrimidine nitrate, 2-pentadecyl-3,4,5,6-tetrahydropyrimidine nitrate, 3-aminoethyl-2-heptadecyl-3,4,5,6-tetrahydropyrimidine nitrate and 3-hydroxyethyl - 2 - heptadecyl - 4,4 - dimethyl - 6 - i-propyl - 3,4,5,6 - tetrahydropyrimidine nitrate are prepared in the same manner.

The 2-alkyl-3,4,5,6-tetrahydropyrimidines from which the nitrate salts of the present invention are formed are known to be very effective fungicidal agents, but their usefulness as foliage fungicides is severely limited by the narrow margin between the minimum rate of application of toxicant which will give fungus control and the maximum rate of application of toxicant which will not injure the foliage of plants treated therewith.

The nitrate salts of 2-alkyl-3,4,5,6-tetrahydropyrimidines are unique in that the range between the minimum effective fungitoxic rate of application and the maximum non-phytotoxic rate of application is very large. This unique property of the 2-alkyl-3,4,5,6-tetrahydropyrimidine nitrate salts is demonstrated by the following example:

2 - heptadecyl - 4,4,6 - trimethyl - 3,4,5,6 - tetrahydropyrimidine (HTTP) and various salts thereof were formulated as water emulsions of inert organic solvents for the toxicant. In each case, the formulation contained about 0.033 wt. percent of the toxicant. The various toxicants were tested for phytotoxicity by spraying upon tomatoes, celery. and beans at a rate of about 125 galons of emulsion per acre and observing the percent of foliage injured after 8 days (in the case of tomatoes) and after 14 days (in the case of celery and beans). The toxicants were also tested for fungitoxicity against the powdery mildrew of beans (Erysiphe polygoni), rust of beans (Uromyces appendiculatus), late blight of tomatoes (Phytophthora infestans), and late blight of celery (Septoria apiigraveolentis), by noting the degree of control of these diseases by the toxicants applied at the same rate and concentration as for the phytotoxicity tests.

The results of the foregoing tests are listed in the following table, in terms of phytotoxicity and fungitoxicity of the salts relative to the free tetrahydropyrimidine. The Safety Index values are the ratios of relative fungitoxicity to relative phytotoxicity and are a measure of the range between minimum fungitoxic rate of application and maximum non-phytotoxic rate of application of the toxicants.

| Compound | Relative Phyto-toxicity | Relative Fungi-toxicity | Safety Index |
|---|---|---|---|
| HTTP | 1.00 | 1.00 | 1.00 |
| HTTP sulfate | 0.86 | 0.93 | 1.08 |
| HTTP acetate | 1.09 | 1.08 | 0.99 |
| HTTP nitrate | 0.01 | 0.79 | 79 |

From the foregoing table it is readily apparent that the nitrate salt is very much safer than the free base or the other salts.

The present 2-alkyl-3,4,5,6-tetrahydropyrimidine nitrate salts may be advantageously utilized as dusts, solutions in oils or other organic liquids, dispersions in water, or as water emulsions of an oil (or other organic oleaginous liquid) solution of said salts.

The latter type of formulation is a preferred one, especially when the organic (oleaginous) liquid solvent is a hydrocarbon, particularly an aromatic hydrocarbon, such as toluene, xylene, or mesitylene, ethyl benzene, etc. These water-immiscible organic liquid solutions are generally known as emulsifiable concentrates, and contain between about 5 wt. percent and about 50 wt. percent of the nitrate salt in solution. This solution may also contain an emulsifier to promote dispersion of the solution in water. However, the present nitrate salts themselves have considerable surface activity, so an additional emulsifier may often be unnecessary. The solution is generally emulsified in sufficient water to bring the concentration of the active ingredient down to between about 1 and 5% of the total formulation.

Surface-active agents, such as emulsifiers or other agents for dispersing the present toxicants (or solutions thereof) in water, may be either cationic, anionic, or non-anionic. In general, the cationic emulsifiers are preferred. Examples of suitable emulsifiers are sodium petroleum sulfonates, mixtures of fatty acid esters of polyethylene glycols, aromatic polyethylene glycol ethers, polyoxyethylene lauryl alcohols, dimeric dialkylphenoxypolyethoxy ethanols, glyceryl phthalic alkyl resins, polymeric condensation products of alkylene groups and aliphatic amides, heptadecyl glyoxalidine salts, etc.

A typical formulation of an emulsifiable concentrate is as follows:

| | Wt. percent |
|---|---|
| 2 - heptadecyl - 4,4,6 - trimethyl - 3,4,5,6 - tetrahydropyrimidine nitrate | 25 |
| i-Propyl alcohol | 66 |
| Heavy machine oil (vis. of 95 S. S. U. C. 210° F | 5 |
| Emulsifier (an aralkyl poly-ether alcohol) | 4 |

The machine oil is added as a so-called "sticker" to increase the resistance of the applied formulation to weathering.

The foregoing emulsifiable concentrate is emulsified in sufficient water to reduce the concentration of the toxicant from 14% down to about 0.04%. This emulsion, applied at a rate of from about 100 to 150 gallons per acre, is extremely useful in controlling diseases such as late blight of celery (*Septoria apii-groveolentis*), late blight of tomatoes (*Phytophthora infestans*), and apple scab (*Venturia inaequalis*).

We claim as our invention:

1. 2 - heptadecyl - 4,4,6 - trimethyl - 3,4,5,6 - tetrahydropyrimidine nitrate.

2. A fungicidal composition comprising 2-heptadecyl-4,4,6 - trimethyl - 3,4,5,6 - tetrahydropyrimidine nitrate dissolved in an inert organic solvent therefor and a surface active agent adapted to disperse the solution in water.

References Cited in the file of this patent

UNITED STATES PATENTS

| 2,516,626 | Haury | July 25, 1950 |
| 2,534,828 | Mitchell et al. | Dec. 19, 1950 |

OTHER REFERENCES

Frear: Chem. of Insecticides, Fungicides and Herbicides, 2nd edition (1948), pp. 283 to 287.